Dec. 17, 1957  R. J. TAYLOR  2,816,721
ROCKET POWERED AERIAL VEHICLE
Filed Sept. 15, 1953
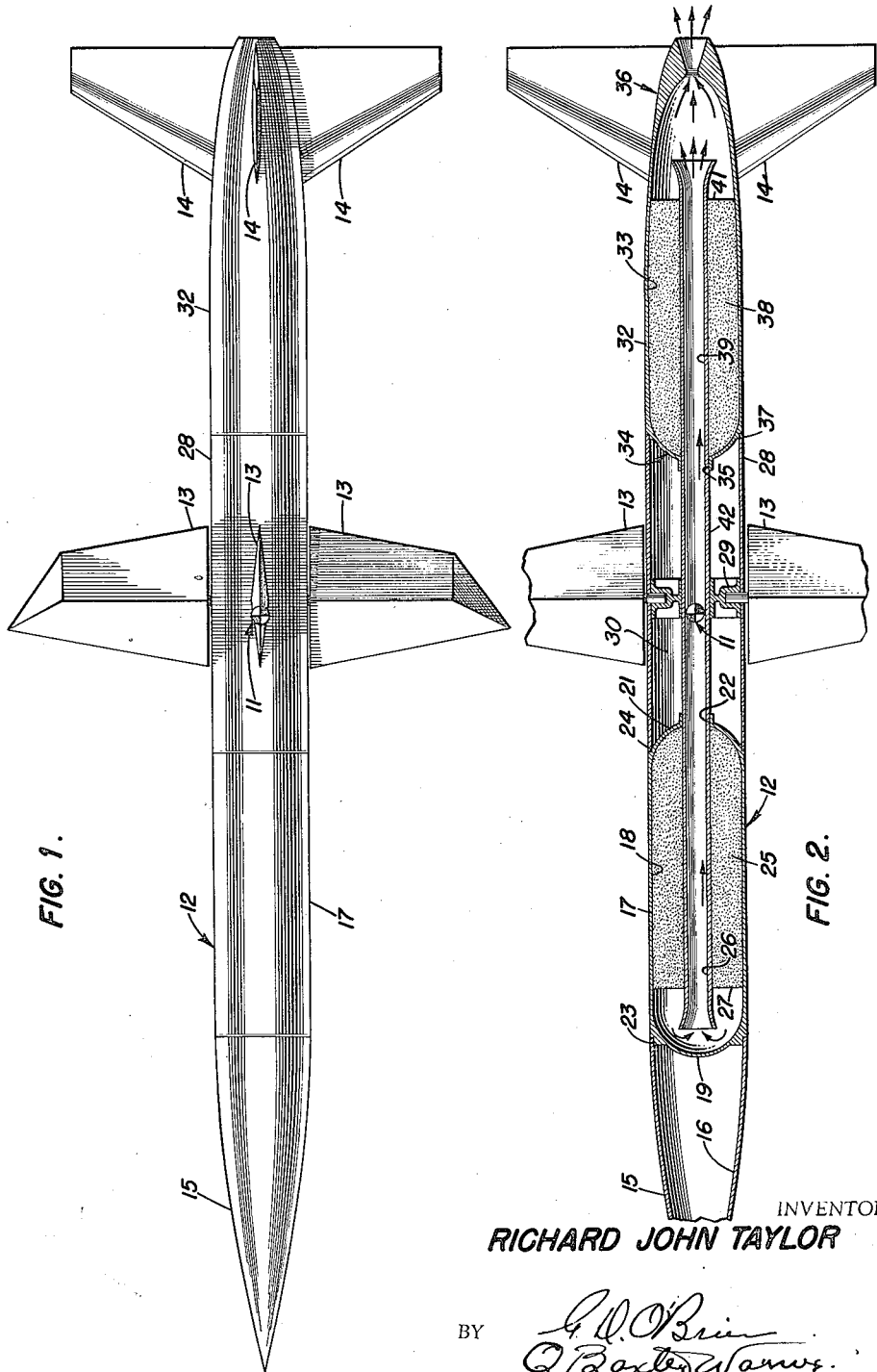
INVENTOR
RICHARD JOHN TAYLOR
BY
ATTORNEYS

United States Patent Office 2,816,721
Patented Dec. 17, 1957

2,816,721
ROCKET POWERED AERIAL VEHICLE

Richard John Taylor, Buffalo, N. Y., assignor to the United States of America as represented by the Secretary of the Navy Application September 15, 1953, Serial No. 380,380

4 Claims. (Cl. 244—74)

This invention relates generally to aerial vehicles and more particularly to an improved rocket engine for an aerial vehicle.

The conventional rocket engine employs a solid propellant fuel in the form of a grain or several grains which may be designed for end burning. A grain designed for end burning is characterized by even burning to produce a constant thrust throughout the life of the grain. However, the ordinary end burning grain in being consumed causes a shift in the center of gravity of an aerial vehicle propelled by the grain. Such a shift upsets the optimum conditions for which the vehicle was designed and brings into play aerodynamic forces which affect the steering control of the vehicle.

It is customary in the construction of aerial vehicles to locate wing surfaces at the center of gravity. In general, the center of gravity is positioned in the heaviest portion of the vehicle which in most cases is that containing the propulsion system. A rocket powered vehicle, therefore, is generally constructed with wing surfaces mounted on that area of the vehicle constituting the rocket engine. A serious problem is presented, however, in attaching wings to a rocket engine because of the corrosive effects of hot combustion gases normally produced in the operation of the engine. This problem is further complicated if wing control apparatus is to be employed for varying the attitude of the wings.

It is, therefore, the principal object of this invention to provide a rocket engine having a substantially stable center of gravity.

A further object of this invention is to provide a rocket engine in which combustion gases normally produced in operation are handled in such a manner that their corrosive effect is restricted.

Further objects and attendant advantages of this invention will become evident from the following detailed description taken in conjunction with the accompanying drawings, in which:

Fig. 1 is a side elevation of a rocket powered aerial vehicle; and

Fig. 2 is an axial section of the main body of the aerial vehicle shown in Fig. 1, particularly illustrating the rocket engine constituting the present invention.

Referring now to Fig 1, the aerial vehicle shown therein has a center of gravity 11 and includes a hollow main body 12, wings 13 mounted on said main body at the center of gravity 11 and tail fins 14 mounted on the rear end portion of the main body.

As best shown in Fig. 2, the body 12 comprises four sections. The forwardmost section includes a casing 15, in the shape of an ogive forming the nose of the body 12. A compartment 16 is defined by the casing 15 and is adapted to accommodate a warhead and/or guidance instrumentation.

The section next to the rear of the casing 15 is a cylindrical shell 17 constituting a forward combustion chamber 18. The shell 17 is constructed with a hemispherical forward end wall 19 and a hemispherical rear end wall 21 having an opening 22. The forward end wall 19 is formed with an external annular shoulder 23 for receiving the rear end of the casing 15 and for connecting said casing to the shell 17, by way of welding, riveting or by other suitable means. The rear end wall 21 is similarly formed with an external annular recess 24 for connecting the shell to the section next rearward, to be described hereinafter. A propellant grain 25, cylindrically shaped with an axial bore 26, is disposed in the chamber 18. As shown in Fig. 2, the grain 25 fills the rear and intermediate portions of the shell 17 but ends short of the forward end wall 19 in a transverse burning surface 27 confronting said forward end wall.

Immediately to the rear of the shell 17 there is positioned a cylindrical casing 28 constructed with wing sockets 29 on its intermediate portion and defining a cell 30 for the accommodation of wing control and other apparatus. The wing sockets 29 mount wings on the body 12 and may be adapted to permit wing movements induced by the wing control apparatus contained in the cell 30. The forward end of the casing 28 is received by the annular shoulder 24 in the shell 17 for attachment to said shell in any suitable manner.

The rearmost section of the body 12 comprises a second cylindrical shell 32 constituting a rearward combustion chamber 33. Thes hell 32 is constructed with a hemispherical forward end wall 34 having an opening 35, and with an exhaust nozzle 36 at its rear end. The forward end wall 34 is formed with an external shoulder 37 which receives the rear end of the cylindrical casing 28 and is attached thereto by any appropriate securing medium. A propellant grain 38 having an axial bore 39 and disposed within the shell 32 fills the forward and intermediate portions of said shell but ends short of the nozzle 36 in a flat burning surface 41 which confronts said nozzle.

In order to provide gas transfer communication between the combustion chambers 18 and 33, a tube 42, made of a heat resistant material, communicates with the forward combustion chamber 18 and extends, axially of the missile, into the rear combustion chamber 33. More specifically, the tube 42 passes through the axial bore 26 of the grain 25 and the opening 22 into the casing 28. It extends axially through the casing 28 and enters the rear combustion chamber 33 through the opening 35, whereupon it extends along the bore 39 of the grain 38 to communicate with the chamber 33.

The rocket engine of this invention, therefore, comprises the forward combustion chamber 18 containing the propellant grain 25, the rear combustion chamber 33 containing the propellant grain 38 and the gas transfer tube 42 providing communication between said combustion chambers. In operation, the grain 25 in the forward chamber 18 burns rearwardly, from the burning surface 27, and the combustion gases thereby produced are conducted through the tube 42 to the rear chamber 33. The grain 38 in the rear chamber 33 burns forwardly from the burning surface 41. The combustion gases from both combustion chambers, 18 and 33, combine and efflux through the exhaust nozzle 36, thus providing a propulsive thrust.

By dividing the propellent grain of the rocket engine in the manner described above, it is possible to safely mount the wing sockets 29 or other wing attaching means at the center-of-gravity of said engine. In addition, such an arrangement also permits the convenient location of guidance and/or wing actuating equipment proximate to the wing sockets and wings.

It can be seen that the center-of-gravity 11 of the rocket engine of this invention will remain substantially in the same position during the burning of the propellant grains 25 and 38. This feature is of utmost importance when the engine is used as the propulsive system in an aerial vehicle.

The propulsive thrust produced by this improved rocket engine is greatly increased over a conventional rocket engine of equal cross-sectional dimensions. This will be understood from the fact that two surfaces on the propellant grains, 27 and 41, of the improved engine burn to produce a greater volume of combustion gases and a higher pressure. Thus, the combustion gases efflux through the exit nozzle with a greater momentum to produce an increased thrust, whereas the conventional rocket engine employs a propellant grain which burns from a single surface only, thereby producing a smaller volume of combustion gases at lower pressures, with the result that the thrust of the conventional rocket engine is smaller.

Obviously many modifications and variations of the present invention are possible in the light of the above teachings. It is therefore to be understood that within the scope of the appended claims the invention may be practiced otherwise than as specifically described.

What is claimed is:

1. In combination with an aerial vehicle having two pairs of wings arranged in a cruciform configuration and pivotally mounted on the body of said vehicle at the center of gravity thereof and two pairs of tail fins mounted on the rear end of said body of said vehicle, a rocket engine located in said vehicle body, said engine including spaced forward and rearward combustion chambers containing combustible material, said combustion chambers and combustible material being located substantially symmetrical with respect to the center of said vehicle, said combustible material of said forward combustion chamber being arranged to burn rearwardly of said vehicle and said combustible material of said rearward combustion chamber being arranged to burn forwardly of said vehicle, a rearwardly directed nozzle connected to said rearward combustion chamber, and means including a transfer tube for conducting combustion gases generated upon ignition of said combustible material from said forward combustion chamber to said rearward combustion chamber for efflux through said nozzle, whereby upon burning of said combustible material in said combustion chambers, the center of gravity of said vehicle remains substantially in the same position.

2. An arrangement as set forth in claim 1, wherein said combustion chambers are cylindrical in shape.

3. An arrangement as set forth in claim 2, wherein said combustion chambers have hemispherical end walls.

4. An arrangement as set forth in claim 1, wherein structure is provided between said combustion chambers to define an intermediate chamber for receiving guidance and control equipment, including means for attaching said two pairs of wings to said vehicle.

References Cited in the file of this patent

UNITED STATES PATENTS

| | | |
|---|---|---|
| D. 171,293 | Boyd | Jan. 19, 1954 |
| 2,206,809 | Denoix | July 2, 1940 |

FOREIGN PATENTS

| | | |
|---|---|---|
| 580,598 | France | Sept. 4, 1924 |
| 1,012,420 | France | Apr. 16, 1952 |

OTHER REFERENCES

Popular Science, Dec. 1943, page 67.